Figure 1:
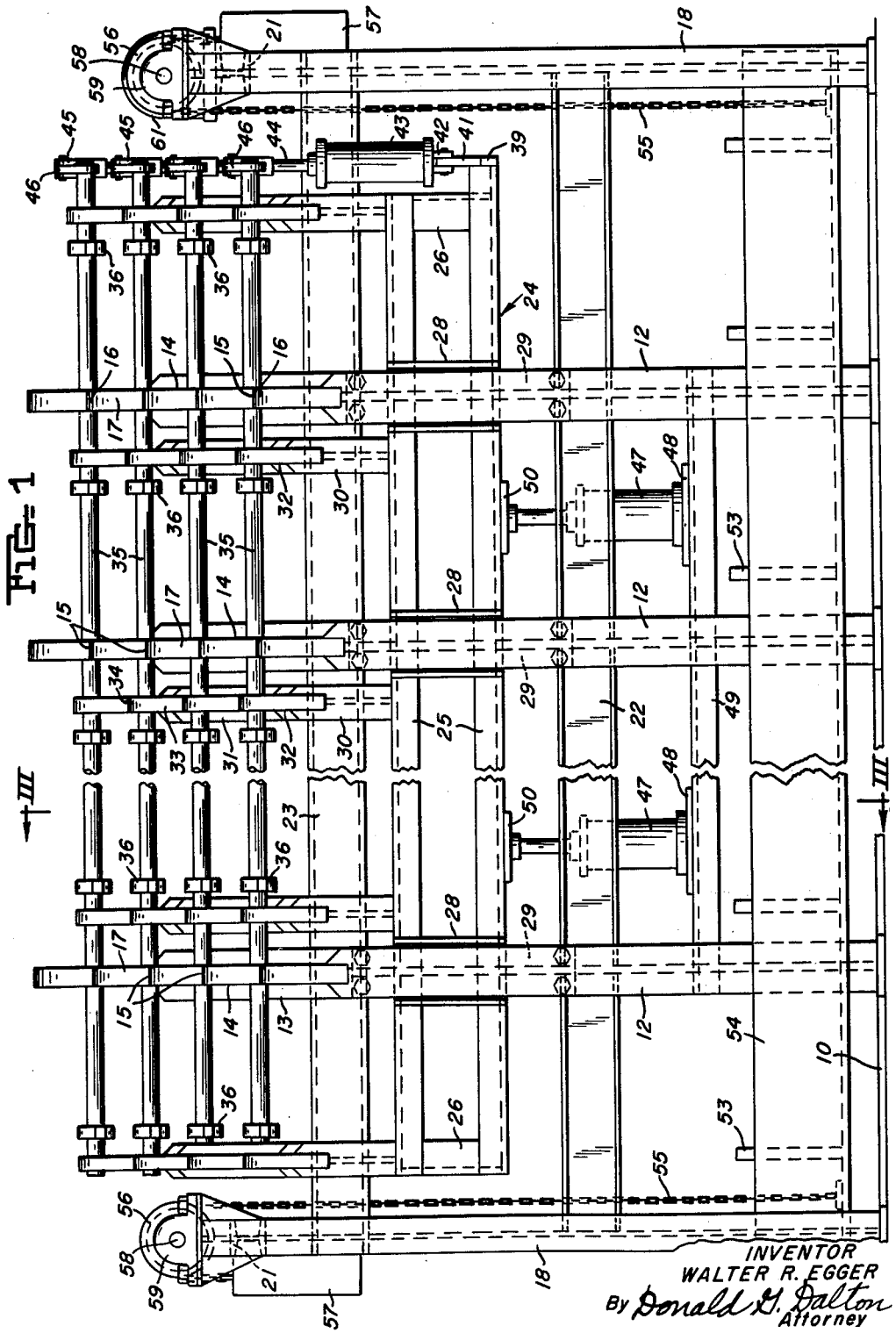

July 6, 1965

W. R. EGGER 3,193,115

STEPPED TABLE FOR SUPPORTING BILLETS DURING
INSPECTION OR SCARFING

Filed Oct. 31, 1962

3 Sheets-Sheet 1

INVENTOR
WALTER R. EGGER
By Donald G. Dalton
Attorney

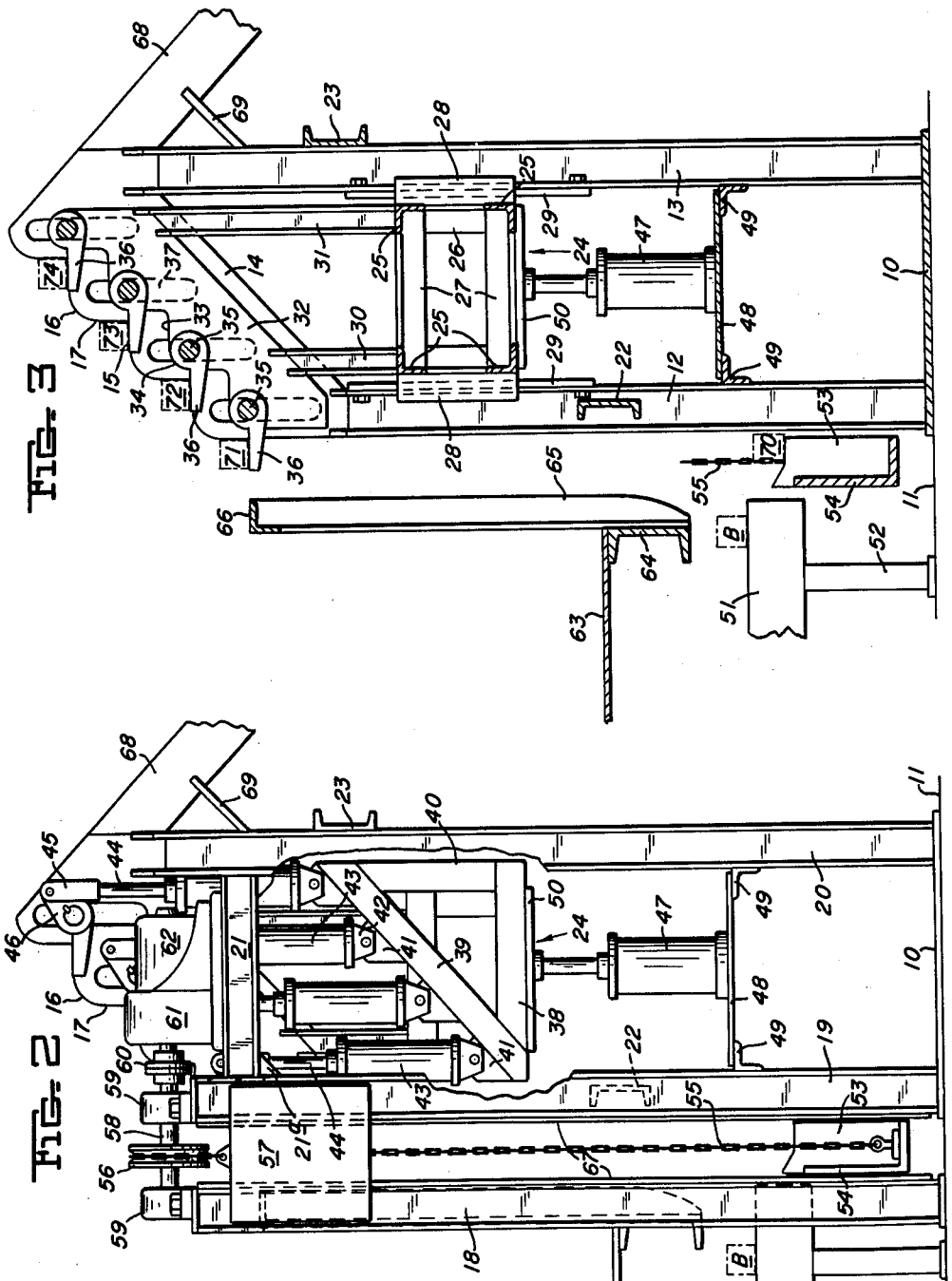

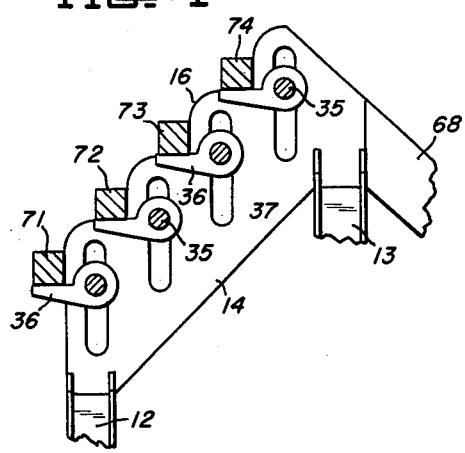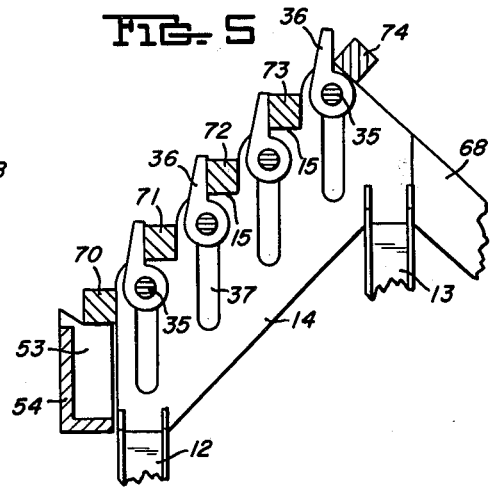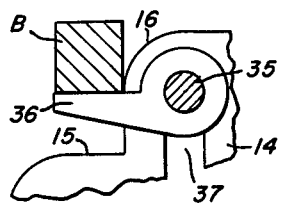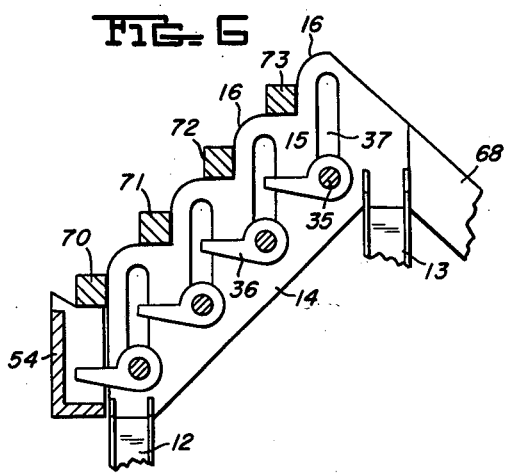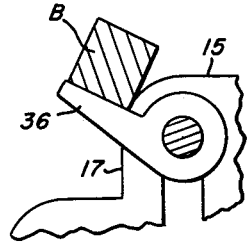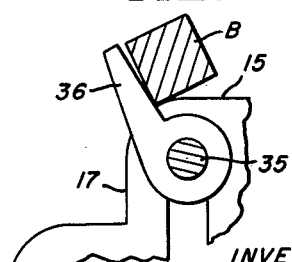
INVENTOR
WALTER R. EGGER
By Donald G. Dalton
Attorney

United States Patent Office 3,193,115
Patented July 6, 1965

3,193,115
STEPPED TABLE FOR SUPPORTING BILLETS
DURING INSPECTION OR SCARFING
Walter R. Egger, Austintown Township, Mahoning County, Ohio, assignor to United States Steel Corporation, a corporation of New Jersey
Filed Oct. 31, 1962, Ser. No. 234,297
11 Claims. (Cl. 214—1)

This invention relates to apparatus for handling billets and the like and, more particularly, to apparatus for turning billets and similar articles so as to present successively each of the faces thereof for inspection, scarfing, chipping or the like.

Billets, after being rolled, are inspected and marked for scarfing, chipping or any other necessary conditioning. For this purpose, each billet must be turned successively to present each of its longitudinal faces or surfaces to the workmen doing the job.

It is therefore an object of this invention to provide apparatus for quickly turning billets, blooms and the like to present successively the longitudinal faces and corners thereof for inspection and conditioning.

Another object is to provide such apparatus which will turn simultaneously a plurality of billets with each operation of the apparatus.

A more specific object is to provide apparatus in which a billet is picked up from a source of supply and transferred to a plurality of spaced beams. Lift arms, keyed to shafts journaled in a plurality of spaced, vertically-reciprocable plates, then transfer and turn the billet successively onto the ascending steps of the spaced beams and finally onto discharge means.

In accomplishing these and other objects of the invention, I have provided billet-handling mechanism of improved structure, a preferred form of which is shown in the accompanying drawings. In the drawings:

FIGURE 1 is a front elevation of a billet-turning apparatus of invention;
FIGURE 2 is a side elevation of the apparatus;
FIGURE 3 is a section taken on line III—III of FIGURE 1, showing the parts in the initial operating position;
FIGURES 4–6 are schematic diagrams showing the sequence in operation of the parts; and
FIGURES 7–9 are schematic diagrams showing the sequence in turning a billet on an arcuate edge of a spaced beam.

As shown in FIGURES 1, 2 and 3, a billet-turning apparatus includes a frame which may be mounted on a base plate 10, secured to a floor 11. The frame includes a plurality of longitudinally spaced pairs of vertical columns 12, 13, which may be H-beams. Each pair of columns is connected at their upper ends by a transverse beam or plate 14, the upper edge of which has a series of ascending steps 15 thereon, each step including an arcuate edge portion 16, above a vertical riser 17. Erected adjacent respectively to each end pair of longitudinally spaced columns 12, 13, for a purpose to be described later, are a plurality of spaced columns 18, 19, 20, connected at their upper ends by transverse beams 21 and bracing gussets 21a. Longitudinally disposed bracing plates or channels 22, 23 are welded or otherwise attached to columns 12, 19 and 13, 20 respectively.

A carriage, indicated generally at 24, is disposed longitudinally within the frame and mounted to reciprocate vertically therein. The carriage comprises four, spaced, parallel angles 25, connected at their ends respectively, by vertical angles 26 and transverse angles 27. Intermediate the ends, the carriage is supported by vertical channels 28 fastened to angles 25. The channels guide and stabilize the carriage in its vertical movement on wear plates 29, bolted to columns 12, 13.

Transverse pairs of vertical columns 30, 31, which may be H-beams, are spaced longitudinally on and attached t o carriage 24, preferably adjacent columns 12, 13 respectively. Each pair of columns 30, 31 is connected at their upper ends by a transverse plate 32, the upper edge of which has a series of ascending steps 33 thereon, separated by arcuate edge portions 34. Steps 33 and arcuate edge portions 34 are generally parallel to corresponding steps 15 and arcuate edge portions 16 respectively on beams 14. Extending longitudinally of and journaled in plates 32 are a number of shafts 35, equally spaced apart transversely and below corresponding steps 15 in beams 14. Each shaft 35 has a lift arm 36 keyed thereto adjacent each plate 32. In its normal, horizontal position, each arm 36 projects beyond the adjacent arcuate edge portion 16 of the step 15 that is above its shaft 35 and extends immediately below and parallel to adjacent step 15. The shafts pass through vertical slots 37 in beams 14, to permit relative movement between plates 32 and fixed beams 14. At one end of carriage 24, angles 25 thereof support bars 38, 39, 40 welded together generally in the shape of a right triangle. Spaced pivot lug 41 welded to bar 39 are pinned to and pivotally support clevises 42 of hydraulic motors 43. The piston rods 44 of motors 43 have clevises 45 pivotally pinned to cranks 46 that are keyed respectively to shafts 35.

For the purpose of reciprocating the carriage vertically, spaced hydraulic motors 47 are provided which operate in the usual, well-known manner. The motors 47 are supported on longitudinal plates 48 and angles 49 attached to columns 12, 13. Transverse plates 50 attached to angles 25 support carriage 24 and transmit thereto the thrust from motors 47.

A supply table 51 is supported on uprights 52 and is provided with means (not shown) for supplying billets B to a lifting means comprising longitudinally spaced shoes 53 welded to a carrier or lift beam 54, which may be in the form of an angle. The lift beam 54 is raised or lowered by a drive means on each end thereof, supported on columns 18, 19, 20. Attached to the ends of lift beams 54, each drive means comprises a chain or cable 55 passing over a sheave or drum 56 and attached to a counterweight 57. The shaft 58 of sheave 56 is journaled in bearings 59 and connected by a coupling 60 through gearing 61 to a motor 62.

An operator's platform 63 bridging supply table 51 is supported on channel 64, which also supports spaced vertical guide bars 65 connected at their upper ends by a longitudinal angle 66. The guide bars protect the operator and guide the lift beam 54, as do wear plates 67 attached to columns 18, 19. On the outlet side of the apparatus, billets may be ejected over a skid bar 68 attached at its upper end to each beam 14, at its lower end to a conveyor frame or the like (not shown) and supported by a bracket 69 on column 13.

FIGURES 4, 5, 6, 7, 8 and 9 are schematic diagrams showing the sequence in successively turning the billets 70–74, inclusive. After a longitudinal face thereof has been exposed for inspection or the necessary work done thereon, in the normal position of the apparatus shown in FIGURE 4, each billet is ready for a simultaneous quarter turn to expose an adjacent face. As the carriage 24 is raised by hydraulic motors 47, the plates 32 and lift arms 36 are raised and in turn lift the billets B from the respective steps 15 of beams 14, as shown in FIGURE 7. Hydraulic motors 43 by means of piston rods 44 turn cranks 46, shafts 35, lift arms 36 and thereby turn the billets on arcuate edge portions 16 of beams 14 to the adjacent steps 15 as shown in FIGURES 8 and 9. Billet 74 is discharged to skid bars 68. A billet 70 is supplied from supply table 51 to lift beam 54. By operating motor 62, the lifting means raises lift beam 54 to the position shown in FIGURE 5. With the lift arms 36 remaining in the vertical position shown in FIGURE 5, the carriage is lowered until shafts 35 approach the lower ends of slots 37. Thereafter hydraulic motors 43 extend piston rods 44 thereby rotating lift arms 36 to the position shown in FIGURE 6.

When carriage 24 is again raised, the first of the series of lift arms 36 raises billet 70 from lift beam 54, which may then be lowered, loaded with another billet and raised preparatory to repeating the above-described operation, after inspection of or work on the newly-exposed billet surfaces. This operation is repeated, successively rotating the billets a quarter turn with each operating cycle of the lift arms until all longitudinal surfaces of the billets have been exposed for inspection or for access thereto.

While I have shown and described only a single embodiment of my invention, it is apparent that modifications therein may be made. Therefore, I do not wish to be limited to the disclosure set forth but only to the scope of the appended claims.

I claim:

1. Billet turning apparatus comprising a plurality of inclined, longitudinally spaced beams, a series of ascending steps formed on said beams, the rise of each step being at least equal to the width of a billet edge, each step having a generally ascending arcuate edge portion, a plurality of longitudinally spaced plates adjacent said beams respectively, a shaft extending longitudinally of said plates below each step and lift arms on each shaft projecting beyond the arcuate edge portion of the adjacent step, means mounting said plates for vertical, parallel movement relative to said beams to raise said lift arms and said billets disposed on said steps and means to rotate said shafts to raise said billets around said arcuate edge portions and to turn each said billet over onto the step thereabove.

2. Apparatus as defined in claim 1 characterized by a pair of transversely spaced columns supporting each beam, said columns supporting a platform extending longitudinally below said beams and carriage reciprocating means mounted on said platform.

3. Apparatus as defined in claim 1 characterized by said means for mounting said plates comprising a carriage extending longitudinally of and below said plates.

4. Apparatus as defined in claim 3 characterized by cranks mounted on one end of said shafts respectively and means supported on said carriage and connected to said cranks whereby to reciprocate said cranks.

5. Apparatus as defined in claim 1 characterized by said beams having slots therein, said shafts passing through said slots for vertical movement relative to said beams.

6. Apparatus as defined in claim 1 characterized by a series of ascending steps formed on said plates.

7. Apparatus as defined in claim 1 characterized by each step on said beams having a vertical riser and an arcuate edge portion.

8. Apparatus as defined in claim 1 characterized by means for feeding a billet to the first in the series of arms, after a lifting and turning operation of said arms.

9. Apparatus as defined in claim 8 characterized by said billet-feeding means comprising a billet carrier extending longitudinally of said beams and vertically reciprocable on the lower side thereof.

10. Apparatus as defined in claim 9 characterized by a plurality of transversely spaced columns adjacent each end pair of said beam-supporting columns, respectively, said plurality of spaced columns supporting a sheave, a chain trained over said sheave connected at the ends thereof respectively to a counter-weight and said billet carrier and power means to turn each of said sheaves and thereby to reciprocate said billet carrier.

11. Apparatus as defined in claim 1 characterized by means associated with said beams for receiving and removing a billet from the last in the series of steps, after a lifting and turning operation of said arms.

References Cited by the Examiner

UNITED STATES PATENTS 1,761,470   6/30   Fisk.
2,822,930   2/58   McGregor.
2,837,200   6/58   Evans.

SAMUEL F. COLEMAN, *Primary Examiner.*

EDWARD A. SROKA, *Examiner.*